United States Patent [19]

McArdle

[11] Patent Number: 5,242,597
[45] Date of Patent: Sep. 7, 1993

[54] FIXED CYCLE TIME ULTRAFILTRATION PROCESS

[75] Inventor: James M. McArdle, Brockport, N.Y.

[73] Assignee: Eastman Kodak Company, Rochester, N.Y.

[21] Appl. No.: 920,131

[22] Filed: Jul. 24, 1992

[51] Int. Cl.$^5$ .................. B01D 61/18; B01D 61/22
[52] U.S. Cl. ........................... 210/652; 210/97; 210/195.2; 210/257.2; 210/321.72
[58] Field of Search ............. 210/195.2, 634, 637, 210/644, 649–652, 97, 130, 137, 138, 195.2, 257.2, 361.6, 321.72

[56] References Cited

U.S. PATENT DOCUMENTS

| | | |
|---|---|---|
| 4,251,292 | 2/1981 | Foreman et al. . |
| 4,276,177 | 6/1981 | Smith . |
| 4,334,012 | 6/1982 | Mignot . |
| 4,336,328 | 6/1982 | Brown et al. . |
| 4,592,841 | 6/1986 | Ancelle et al. ............ 210/195.2 |
| 4,792,401 | 12/1988 | Truex et al. . |
| 4,861,486 | 8/1989 | Lefebvre . |
| 4,894,319 | 1/1990 | Ikeda et al. . |
| 4,945,038 | 7/1990 | Momoki et al. . |
| 4,968,588 | 11/1990 | Ishikawa et al. . |

OTHER PUBLICATIONS

Research Disclosure vol. 102, Oct. 1972, Item 10208.
Researsch Disclosure vol. 131, Mar. 1975, Item 13122.

Primary Examiner—Frank Sever
Attorney, Agent, or Firm—Nixon, Hargrave, Devans & Doyle

[57] ABSTRACT

A method is presented for achieving constant purification cycle times over the life of an ultrafiltration membrane in a silver halide purification system. Silver halide emulsion pumped from a feed vessel enters an ultrapurification module wherein a permeate stream is separated from the emulsion. The permeate stream is then divided into a permeate-to-drain stream and a recycle stream. The recycle stream is returned to the feed vessel. By varying the amount of permeate recycled, a constant permeate-to-drain rate can be maintained, and hence the purification cycle time can be maintained constant despite fouling of the membrane.

24 Claims, 5 Drawing Sheets

FIXED CYCLE TIME ULTRAFILTRATION PROCESS

FIELD OF THE INVENTION

This invention relates to the purification of silver halide emulsions and more particularly to a method of ultrafiltration in which the purification cycle time is standardized by diverting a portion of the permeate back into the reaction vessel.

BACKGROUND OF THE INVENTION

Ultrafiltration is a useful way to concentrate and purify various liquid compositions. Among such compositions are silver halide photographic emulsions. Ultrafiltration is used to remove alkali metal nitrates and other impurities formed in precipitation of the silver halide.

Silver halide emulsions normally are prepared in a batch process by mixing a silver nitrate solution with an alkali metal halide solution in a gelatin medium. The composition is then washed to remove soluble salts. One type of ultrafiltration process suitable for use with the present method is described in Research Disclosures Vol. 102, October 1972, Item 10208 and Vol. 131, March 1975, Item 13122, which are incorporated herein by reference. The soluble impurities, e.g., alkali metal nitrates, permeate through the ultrafiltration membrane and the permeate is discarded.

One problem, however, is that the membrane becomes progressively fouled during use and the rate of permeation decreases. As a consequence, a batch of silver halide emulsion treated with a fresh membrane and one treated with a used membrane will be subjected to different processing conditions, including reactant concentrations, residence time in the reaction zone, fluid level in the reaction vessel, etc. Having been subjected to different processing conditions, the silver halide emulsions prepared in different batches will not have identical physical and photographic characteristics. It is possible to clean the membrane and thereby partially restore its original flux rate. However, some debris remains after each cleaning and the membrane progressively degrades with repeated use until it is too clogged to be of use.

As a result, successive batches of photographic emulsion will experience concentrates that vary widely over the course of one reaction to the next. The concentrate varies because the unwanted salts are removed at different rates because the semipermeable membrane becomes progressively clogged. So, salts are initially rapidly removed thereby initially quickly lowering the salt concentration, but over time, the rate of change of salt concentration is much lower. However, if a membrane is changed in the middle of a reaction, the rate of concentrate will increase again. Such changes make it difficult to time the reactions and the varying changes in concentrate result is inconsistent quality of photographic emulsions.

SUMMARY OF THE INVENTION

It has been discovered that more consistent reactions can be obtained by recycling some of the normally discarded permeate back into the reaction vessel. In accordance with the present invention, an improved apparatus and method are provided by means of which different batches of silver halide emulsion can be prepared and purified under substantially identical conditions. The products, therefore, are highly uniform. The invention separates components from a liquid emulsion by ultrafiltration in such a way as to provide constant purification cycle times throughout the life of a membrane. The invention flows a stream of the liquid composition from a first vessel to a second vessel containing an ultrafiltration membrane. One side of the membrane is maintained at a higher pressure than the other, with the stream flowing in contact with the higher pressure side. The difference in pressure between the sides induces salt-laden fluid (permeate) to flow from the higher pressure side to the lower pressure side. A stream of concentrated emulsion (concentrate) is withdrawn from the higher pressure side and is recycled to the first vessel. A permeate stream is withdrawn from the lower pressure side and is divided into one stream which is recycled to the first vessel and another stream which is withdrawn at a constant flow rate from further contact with the liquid composition. Hence, instead of entirely discarding the unwanted permeate, a portion is recycled into the liquid emulsion from which it was filtered. The amount recycled into the first vessel is dictated by the current condition of the membrane. As the membrane progressively fouls, progressively less permeate is recycled to the first vessel. The net effect is that there is a constant, fixed, and controlled flow of permeate withdrawn from the first vessel, regardless of the condition of the membrane. It is believed novel and unobvious to recycle a portion of this unwanted permeate to reduce variability among emulsion batches.

DETAILED DESCRIPTION

Figure 1:
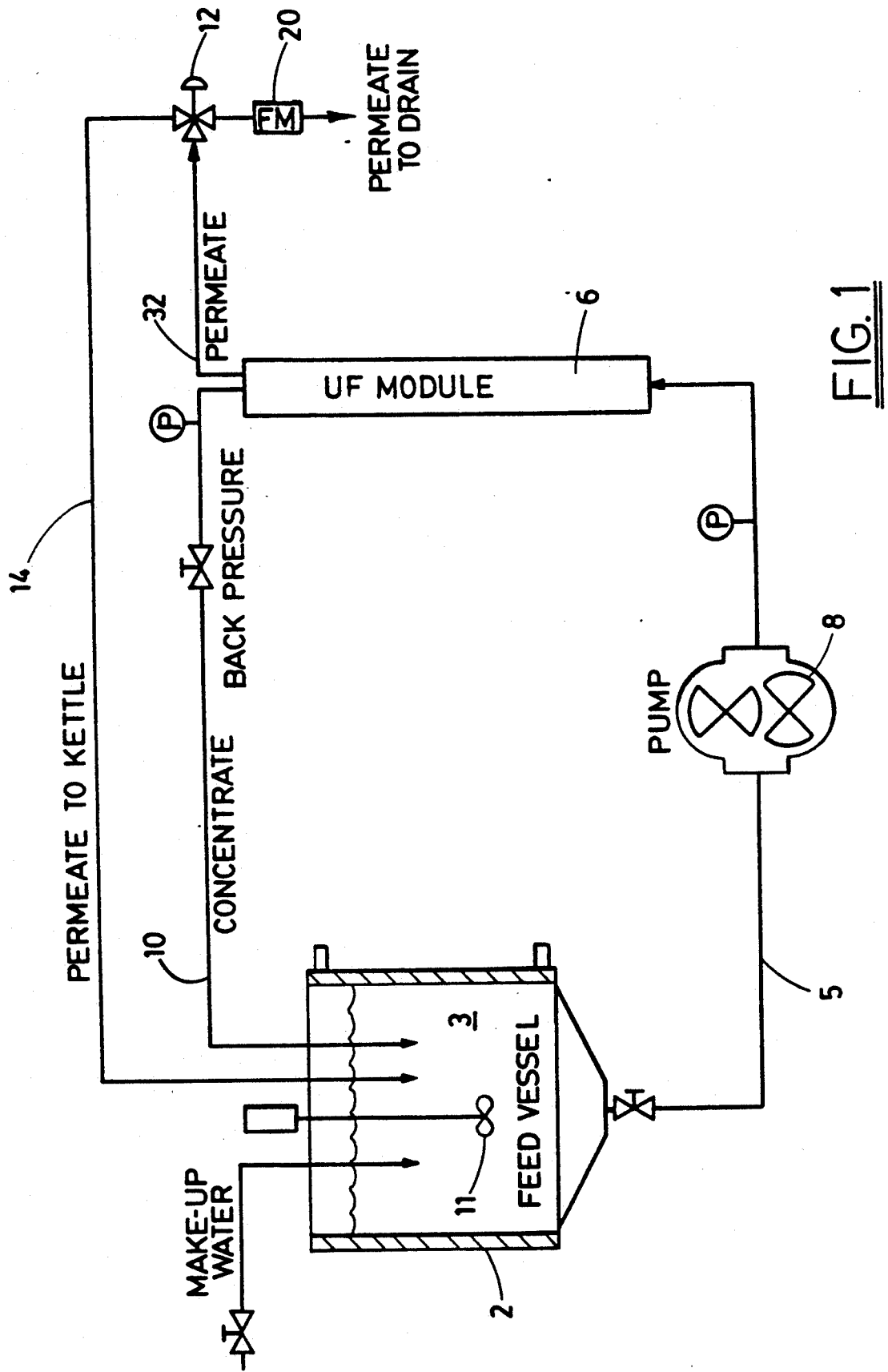
FIG. 1 shows an apparatus for practicing the present invention.
Figure 8:
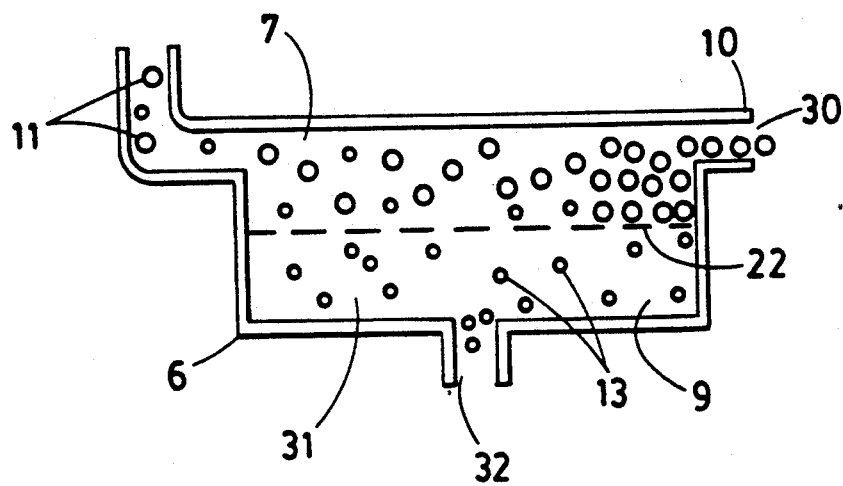
FIG. 8 shows the reverse osmosis ultrafiltration module of the invention.

FIG. 1 shows a preferred apparatus for carrying out one embodiment of the method of the present invention. Solutions of silver nitrate ($AgNO_3$) and potassium bromide (KBr) are combined in the presence of gelatin and react to form of an aqueous emulsion 3 of silver halide crystals. The reaction occurs in a kettle or reservoir 2 that is stirred by agitator 4. In the course of the reaction, crystals of silver halide are precipitated and ions of potassium and nitrate remain as dissolved salt contaminants in the emulsion 3. The emulsion 3 is coupled via line 5 and pump 8 to ultrafiltration module 6. The resulting emulsion 3 is purified of the dissolved salts by ultrafiltration module 6. The ultrafiltration module 6, as shown in FIG. 8, has a high pressure chamber or side 7 and a low pressure chamber or side 9. The differential pressure across a semipermeable membrane 22 causes flow from the high pressure, concentrate side 7 of the module 6 to the lower pressure, filtered, solvent side 9. Semipermeable membrane 22 differentiates the flow of chemicals, retaining molecules having less than a predetermined molecular weight. This principle is illustrated schematically in FIG. 8 by showing materials 11 larger than the predetermined molecular weight and materials 13 smaller than the predetermined molecular weight.

A concentrate stream 30 is then withdrawn from the high pressure chamber 7 and recycled to kettle or reservoir 2 via concentrate line 10. Permeate 31 on the low pressure side 9 of semipermeable membrane 11 is withdrawn from the low pressure side 9 and discharged from ultrafiltration module 6 via permeate output line 32.

Figure 2:
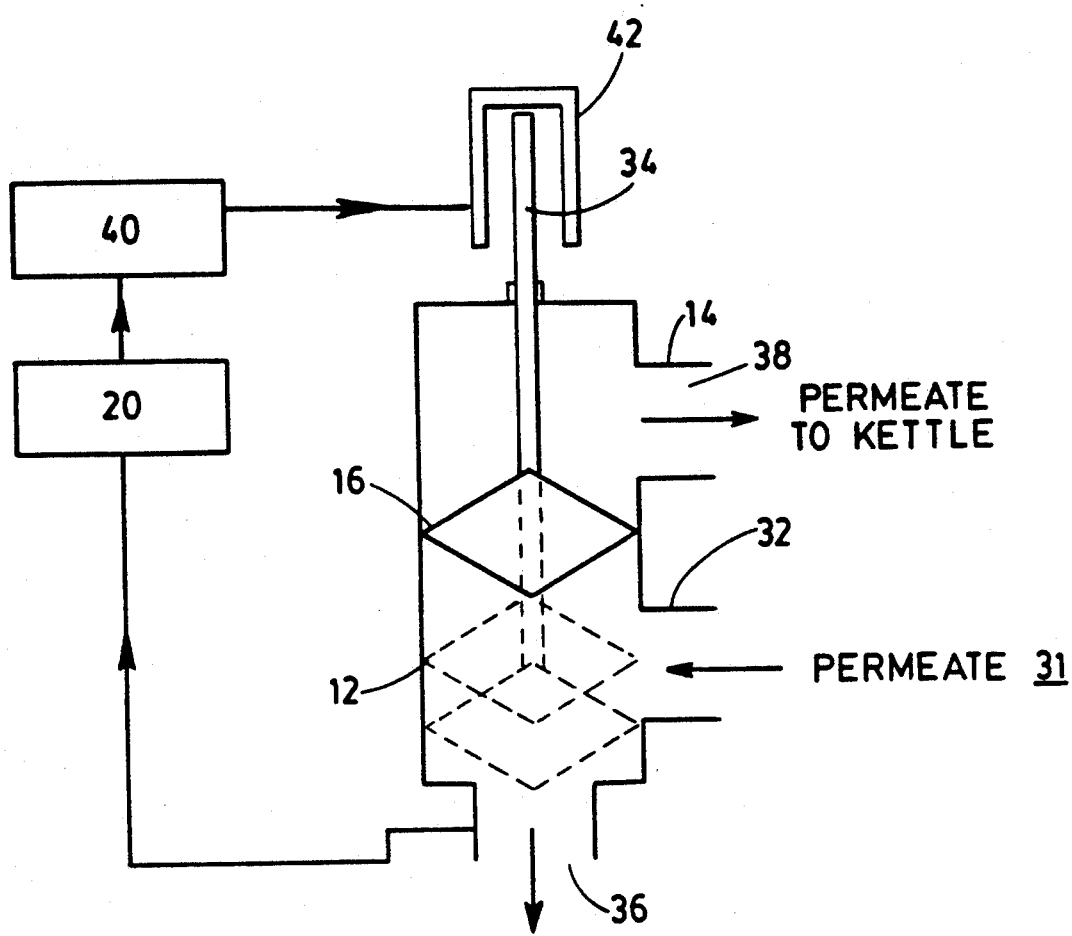
FIG. 2 shows a make-before-break valve for use in the invention.

As shown more fully in FIGS. 1 and 2, permeate output line 32 is in fluid communication with a fluid control valve 12. A longitudinally moveable rod 34 is coupled to a valve seat 16. Such a valve may be a spool valve with seat 16 formed from a raised land or seat 16 on rod or spool 34. The function of valve 12 is to divide the permeate flow 31 between a first outlet 36 in fluid communication with a drain and a second outlet 38 in fluid communication with reservoir or kettle 2. Rod or spool 34 is moveable to one of an infinite number of intermediate positions to divide the permeate 31 between the drain and reservoir 2. In the preferred embodiment, rod 34 is positioned to provide a constant rate of flow of permeate 31 to the drain via valve outlet 36.

The valve 12 is controlled by a microcontroller 40 that operates an actuator 42, such as a solenoid, for moving the spool or rod 34. Microcontroller 40 receives control signals from flow meter 20. Meter 20 has a flow control sense line 45 coupled to the drain outlet 36 for monitoring the flow rate of permeate to drain. Microcontroller 40 is programmable to move spool 34 via actuator 42 in order to keep the permeate-to-drain flow a constant.

Figure 3:
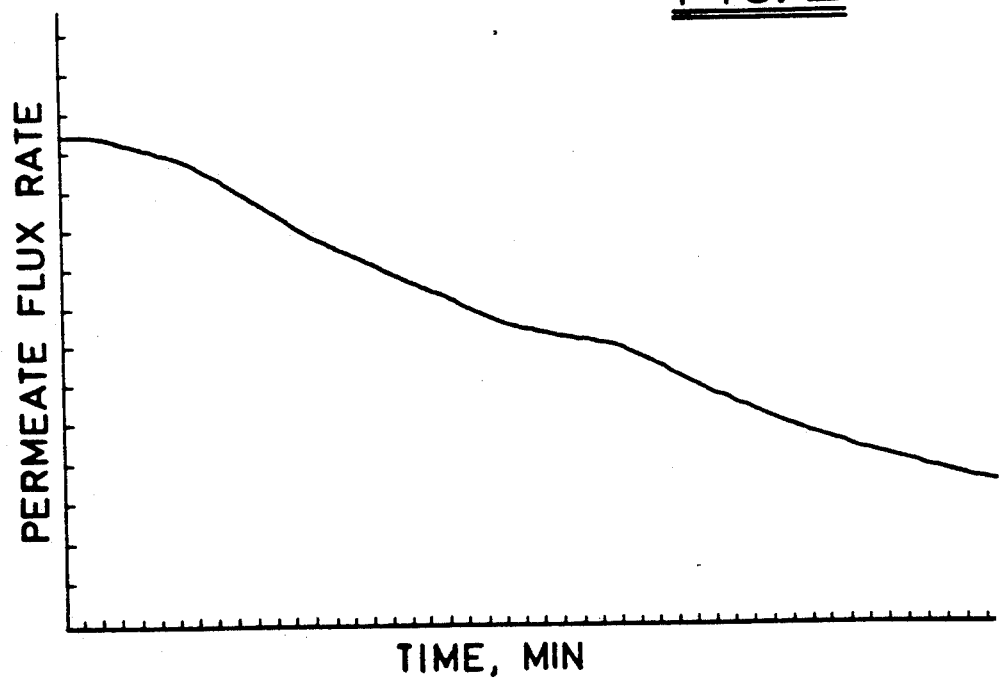
FIG. 3 is a plot of flux rate versus time for a given batch purification process.

At the start of a filtration process, the flow rate of permeate directed to drain is a minor portion of the total permeate stream. This minor portion initially is on the order of 20%. As the flow of liquid concentrate continues over the course of a purification process, the rate of formation of the permeate stream, i.e., the flux rate, will decrease as the membrane becomes fouled. This deterioration of flux rate over the course of a purification batch is shown graphically in FIG. 3. Because permeate is directed to drain at a constant rate, the permeate-to-drain rate will become a larger proportion of the total permeate flow rate as flux rate declines.

The proportion of permeate returned to kettle 2 will depend upon the desired constant flow rate of permeate to drain and on the age of the semipermeable membrane 22. The flow rate to drain must be less than the minimum flux rate of the membrane 22 at any time during the life of the membrane. Thus, with a new permeable membrane and dilute, low viscosity emulsion 3, the amount of permeate returned to kettle 2 is at its highest. As the membrane ages and as the viscosity or concentration rises, the proportion of permeate recycled will decrease. The membrane 22 is regenerated by chemical cleaning procedures before the recycled permeate rate reaches zero.

Cleaning does not restore the membrane to its original condition, however. Throughout its useful life, the membrane gradually becomes permanently fouled and cleaning will not remove all matter clogging it. As a result, the flux rate vs. time plot for a series of batch purifications followed by membrane cleaning resembles the path of a bouncing ball. See FIG. 5. Uniform flux rates for a given feed flow and/or pressure, therefore, are not possible over the life of a membrane, making uniform purification cycle times for a given membrane impossible without varying feed rate and/or filter pressure.

Figure 4:
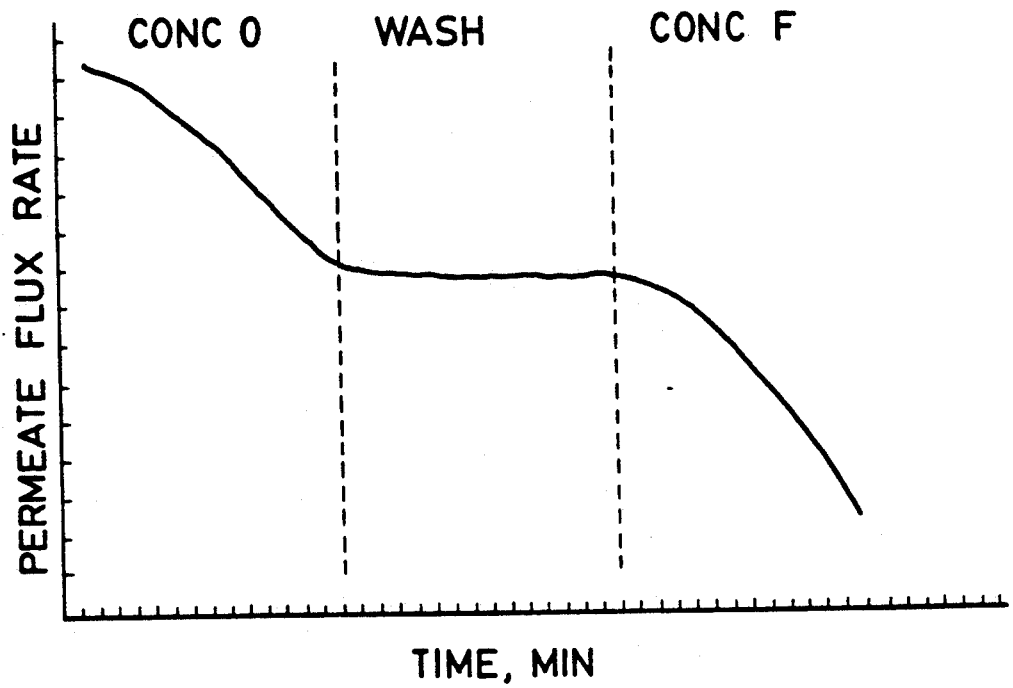
FIG. 4 is another plot of flux rate versus time for a given three phase batch purification process.

The volume of liquid composition in the kettle 2 preferably is allowed to decrease as permeate is directed to drain. In another embodiment of the present method, the volume in kettle 2 is maintained at a constant level by adding a washing liquid, preferably water, at the same rate as the constant rate at which permeate is sent to drain. The purpose of the washing liquid is to remove soluble impurities such as alkali metal halides without changing the concentration of the batch. The effect of this washing phase on flux rate is shown in FIG. 4. The combination of concentrating and washing phases may be necessary to ensure that adequate washing is achieved within aim concentration limits.

As the membrane becomes fouled, the total permeate rate will eventually decrease until it equals the rate at which permeate is diverted to the drain. A signal can be initiated when the valve reaches a position at which, e.g., 90% of the permeate is diverted to the drain. This would signal a need either to clean or to replace the membrane.

EXAMPLE 1

At the start of the process, three way valve 12 is positioned to divert all permeate to kettle 2. When both the designated feed flow rate and system pressure have been obtained, three way valve 12 is repositioned via feedback control from flow meter 20 in the drain line to allow the desired flow of permeate to drain. FIG. 4 graphically shows the change in permeate flux as a function of the various process cycles of concentration and washing.

The process has three phases. They are: 1) an initial concentration (CONCO) phase whereby approximately 50 to 75% of the water contained in the concentrate 7 received from the reaction process is removed; 2) a washing phase (WASH) where the concentration of salts and other addenda are removed to a specified, lower concentration; accomplished by the addition of process water, typically, distilled (DI), demineralized (Dmin), or reverse osmosis (RO) at a rate equivalent to the permeation rate so that the level in the kettle 2 is maintained constant within a specified kettle volume (known as constant volume diafiltration). The degree of washing is controlled by one of several means—turnovers, conductivity, or specific ion concentration. After the concentrate 7 has reached the desired level of purity, the third phase is entered—a concentration step (CONCF) where additional water is removed to further increase the concentration of the macrosolute to a predetermined value that is particular for that product.

Because three way valve 12 is automatically repositioned in response to permeate to drain flow changes, a decline in permeate flux due to increasing product concentration or viscosity will not decrease the quantity of permeate to drain. Typically, when the wash starts, the relative change in the total flux is significantly less than the flux change due to concentration. Upon completion of the wash cycle, additional concentration may be necessary, with the accompanying further decline in permeate flux. In the absence of membrane fouling, additional batches of the same product could be assumed to produce the same permeate flux rates at each point in the process, be it either concentration or wash.

Figure 5:
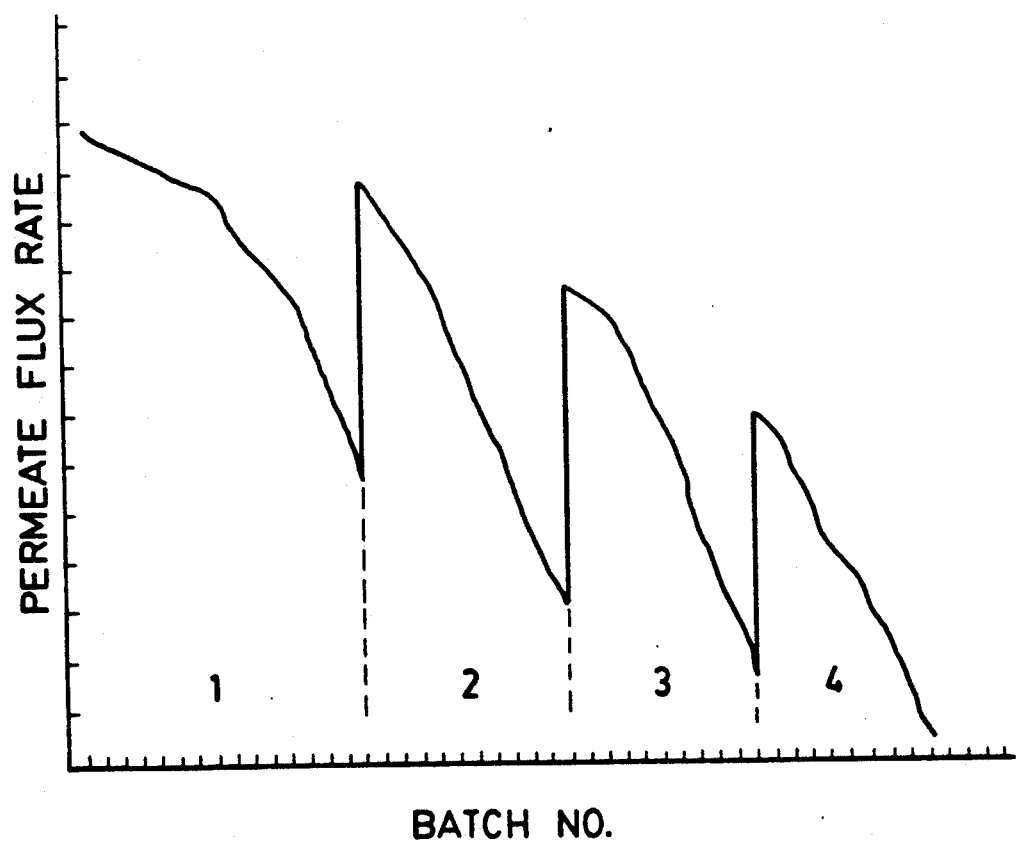
FIG. 5 is a plot of flux rate versus time for a series of batch purification processes followed by semipermeable membrane cleanings.

FIG. 5 shows the effects of membrane fouling as consecutive batches of emulsions are processed through the ultrafiltration unit 6 according to the prior art during initial concentration (CONCO), wash (WASH) and a final concentration (CONCF). Although each batch is followed by a system cleaning procedure, each succeeding batch produces slightly lower maximum flux rates due to the permanent fouling occurring at the membrane surface. The result of this fouling is an increased process time to reach each of the designated cycle end points and an increased overall process time.

Figure 6:
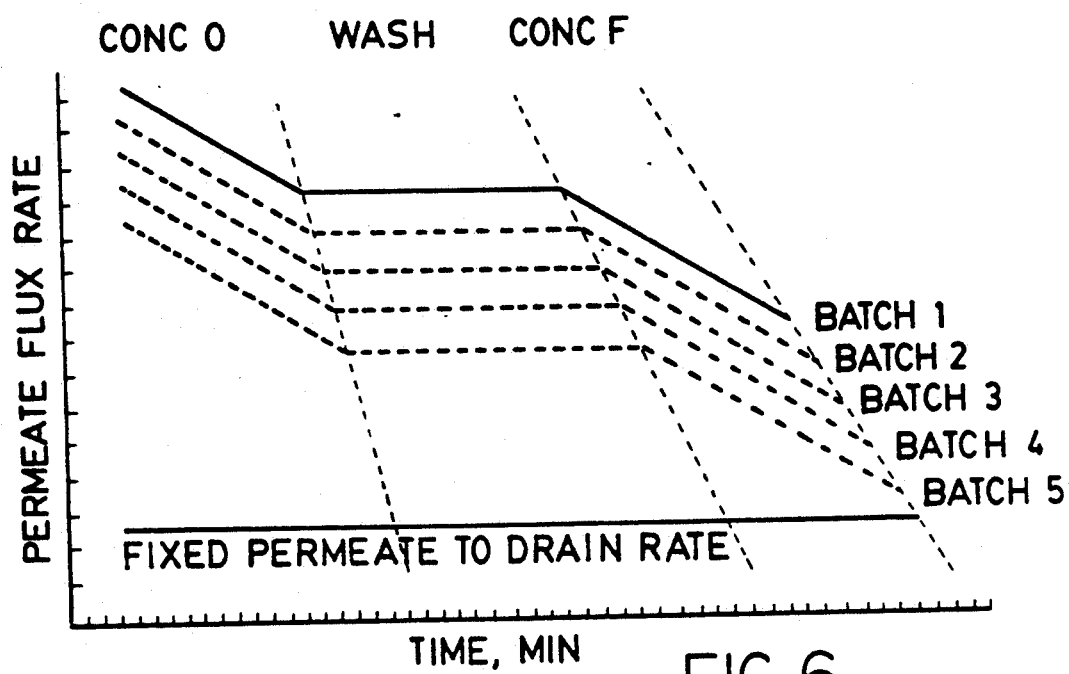
FIG. 6 is another plot of flux rate versus time for a series of three phase batch purification processes having a fixed permeate rate of discharge.

Turning to FIG. 6, there is shown the results of five successive three phase batch processes made according to the subject invention. During each phase of each process, the permeate rate of discharge to drain is held constant. By selecting a fixed permeate rate of discharge to drain for the entire process, the increased batch processing times are eliminated and individual cycle times and overall process times become fixed. Table 1 displays simulated data that might be expected in a series of ultrafiltration processes followed by membrane cleaning.

TABLE 1

|  | Flux Rate | | Fixed Permeate-to-Drain Rate | | Recycle Permeate Rate | | Process Cycle Time |
| --- | --- | --- | --- | --- | --- | --- | --- |
|  | Start | End | Start | End | Start | End | Min. |
| BATCH #1 | 50 | 30 | 10 | 10 | 40 | 20 | 90 |
| BATCH #2 | 45 | 28 | 10 | 10 | 35 | 18 | 90 |
| BATCH #3 | 40 | 25 | 10 | 10 | 30 | 15 | 90 |
| BATCH #4 | 37 | 21 | 10 | 10 | 27 | 11 | 90 |
| BATCH #5 | 33 | 16 | 10 | 10 | 23 | 6 | 90 |

EXAMPLE 2

Figure 7:
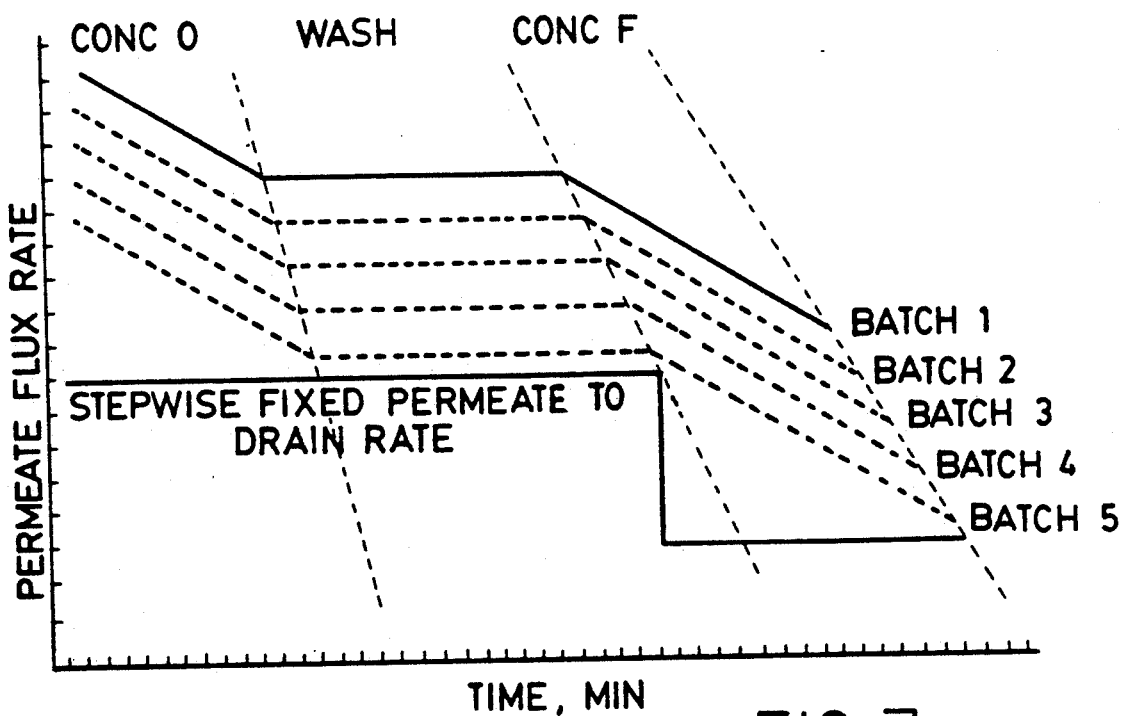
FIG. 7 is a plot of flux rate versus time for a series of three-phase batch purification processes having a stepwise variable rate of discharge.

In another embodiment, the premeate discharge rate is varied, preferably in a stepwise manner prior to the final phase of each process. Turning to FIG. 7, there is shown the results of such variations. The rate is varied by pre-programming the microcontroller 40 to step down the permeate-to-drain rate as the filtration process enters the final concentration stage. While permeate-to-drain rate varies within a given process in this example, the overall goal of a constant process time is achieved while maximizing the efficiency of the permeable membrane 22.

Although described in terms of the purification of silver halide, the method of the present invention can be used in other fields utilizing ultrafiltration processes, including the purification and concentration of gelatin, and the purification of waste effluent, water, food products, and pharmaceuticals.

The invention has been described with particular reference to preferred embodiments thereof, but it will be understood that variations and modifications can be effected within the spirit and scope of the invention. For example, any suitable means can be used to maintain a constant permeate discharge rate. By maintaining a constant discharge rate of permeate and recycling the rest of the permeate back to the reaction vessel 2, the concentration of undesired components is gradually and controllably reduced over time. The overall operation of reaction is thus more consistent from batch-to-batch and its end point is more predictable. In effect, the time for completion of a reaction can be held constant.

What is claimed is:

1. A method of separating unwanted components from a liquid composition by ultrafiltration which comprises providing a predictable time cycle for at least one predetermined batch of said liquid by flowing a stream of said liquid composition from a first vessel to a second vessel which contains an ultrafiltration membrane, one side of which is maintained at a higher pressure than the other, said stream flowing in contact with the higher pressure between said sides the difference in pressure between said sides inducing permeate to flow from the higher pressure side to the lower pressure side, withdrawing from the higher pressure side of the membrane a concentrate stream and recycling said concentrate stream to said first vessel, withdrawing from the lower pressure side of the membrane a permeate stream, and dividing the permeate stream into two streams, one of which is recycled to the first vessel and the other of which is withdrawn from further contact with said liquid composition at a constant flow rate whereby said unwanted components of the liquid composition are separated from the liquid composition in a predetermined time.

2. The method of claim 1 wherein a washing liquid is flowed into said first vessel at said constant flow rate.

3. The method according to claim 2 wherein said washing liquid is water.

4. The method according to claim 1 wherein said liquid composition comprises an aqueous dispersion of silver halide crystals in gelatin which contains contaminant salts formed in the precipitation of said silver halide crystals and wherein said washing liquid is water.

5. The method according to claim 1, wherein at start-up, the constant flow rate of withdrawn permeate is a minor portion of the total permeate stream.

6. The method according to claim 5 wherein said minor portion is less than about 20 percent of the total permeate stream at start-up.

7. The method according to claim 1 wherein the membrane is regenerated before the permeate recycle stream flow rate decreases to zero.

8. A method for removing undesired dissolved components from a fluid comprising:

providing a predictable time cycle for at least one predetermined batch of said fluid by withdrawing said fluid from a first vessel;

introducing the withdrawn fluid under pressure into a first chamber of a second vessel positioned into two chambers by an ultrafiltration membrane for ultrafiltering fluid from said first chamber to said second chamber; and returning only a first portion of ultrafiltered fluid from said second chamber of said second vessel to said first vessel whereby said undesired dissolved components are removed from the fluid in a predetermined time.

9. The method of claim 8 further comprising the step of withdrawing a second portion of the ultrafiltered fluid at a constant rate of flow.

10. The method of claim 8 further comprising the step of returning said withdrawn first portion of ultrafiltered fluid to said first vessel at a variable rate.

11. The method of claim 8 further comprising the step of returning unfiltered concentrate to said first vessel.

12. An apparatus for ultrafiltration comprising:
a reservoir vessel for holding a liquid composition;
an ultrafiltration vessel having an inlet, a first outlet for carrying filtered fluid from said ultrafiltration vessel, and an ultrafiltration membrane disposed between said inlet and first outlet;
and means for providing a predictable time cycle for ultrafiltration of at least one batch of said liquid said means having
a pump coupled between the reservoir and the ultrafiltration vessel inlet for pumping liquid composition into said ultrafiltration vessel and out the first outlet;
a control valve for selectively coupling only a first portion of the filtered liquid from the first outlet into the reservoir in order to filter the liquid of the reservoir in a predetermined time.

13. The apparatus of claim 12 wherein said control valve has an inlet port in fluid communication with the first outlet of the ultrafiltration vessel, a first outlet port in fluid communication with the reservoir vessel and a second outlet port for discharging the remaining portion of ultrafiltered fluid from the apparatus.

14. The apparatus of claim 13 wherein said control valve has a moveable element for connecting the valve inlet to the first and second valve outlets.

15. The apparatus of claim 14 wherein the moveable element is operable to establish a constant flow rate of permeate being withdrawn from further contact with said liquid composition.

16. The apparatus of claim 15 further comprising a programmable controller coupled to said control valve for controlling of said control valve.

17. The apparatus of claim 16 further comprising a flow meter coupled to said control valve for maintaining a constant rate of discharge through the second outlet.

18. The apparatus of claim 17 further comprising a second outlet in said ultrafiltration vessel, said second outlet being in fluid communication with said inlet and with said reservoir vessel for returning concentrated liquid composition from said ultrafiltration vessel to said reservoir vessel.

19. A process for sequentially ultrafiltering two or more batches of concentrate fluid comprising:
providing a predictable time cycle for at least one predetermined batch by withdrawing concentrate fluid from a batch;
ultrafiltering the withdrawn concentrate fluid to provide an ultrafiltered fluid;
returning a sufficient portion of the ultrafiltered fluid to the concentrate fluid and discharging the remaining ultrafiltered fluid so that the time for ultrafiltering each batch is substantially the same.

20. The invention of claim 19 wherein the discharged portion of ultrafiltered fluid is discharged at a controlled selective predetermined rate.

21. The invention of claim 20 wherein the rate of discharge is constant.

22. The invention of claim 20 wherein the rate of discharge is controllably varied during the process.

23. The invention of claim 22 wherein the rate of discharge is varied in a stepwise manner.

24. The invention of claim 23 wherein the stepwise variation occurs near the end of the process.

* * * * *